United States Patent
Parks et al.

(10) Patent No.: US 10,607,385 B2
(45) Date of Patent: Mar. 31, 2020

(54) AUGMENTED REALITY POSITIONING AND TRACKING SYSTEM AND METHOD

(71) Applicant: Trigger Global, Inc., Los Angeles, CA (US)

(72) Inventors: Daniel Parks, Los Angeles, CA (US); Bruce Wu, Los Angeles, CA (US)

(73) Assignee: TRIGGER GLOBAL, INC., Los Angeles, CA (US)

( * ) Notice: Subject to any disclaimer, the term of this patent is extended or adjusted under 35 U.S.C. 154(b) by 0 days.

(21) Appl. No.: 16/200,891

(22) Filed: Nov. 27, 2018

(65) Prior Publication Data
US 2019/0164325 A1    May 30, 2019

Related U.S. Application Data

(60) Provisional application No. 62/592,368, filed on Nov. 29, 2017.

(51) Int. Cl.
| | |
|---|---|
| *G06T 19/00* | (2011.01) |
| *G06T 11/60* | (2006.01) |
| *G06K 19/07* | (2006.01) |
| *G06K 7/10* | (2006.01) |
| *G06K 9/00* | (2006.01) |
| *G06K 9/32* | (2006.01) |

(52) U.S. Cl.
CPC .......... *G06T 11/60* (2013.01); *G06K 7/10297* (2013.01); *G06K 9/00671* (2013.01); *G06K 19/0723* (2013.01); *G06T 19/006* (2013.01); *G06K 2009/3225* (2013.01)

(58) Field of Classification Search
None
See application file for complete search history.

(56) References Cited

U.S. PATENT DOCUMENTS

| | | | |
|---|---|---|---|
| 2015/0109338 A1* | 4/2015 | McKinnon .......... | G06F 16/5866 345/633 |
| 2016/0071319 A1* | 3/2016 | Fallon ................... | G06T 19/006 345/633 |

OTHER PUBLICATIONS

NFC Forum, "Identifying NFC," https://nfc-forum.org/what-is-nfc/identifying-nfc/, 2014. (Year: 2014).*

* cited by examiner

*Primary Examiner* — Nicholas R Wilson
(74) *Attorney, Agent, or Firm* — James J. DeCarlo; Greenberg Traurig, LLP

(57) ABSTRACT

Disclosed are systems and methods for detecting the specific location, orientation, surface plane(s) and scale of a real-world object, and providing an augmented reality (AR) experience of the object based therefrom. The disclosed systems and method provide a novel, efficient and accurate mechanism for launching an AR application that provides an AR view of a captured or currently being viewed image. The instant disclosure's AR positioning and tracking systems and methods provide a streamlined system that maximizes the device's computational resources in order to accurately determine and track the viewed object's and the capturing device's positioning and orientation, as well as the object's physical dimensions, thereby ensuring an efficiently produced AR experience.

17 Claims, 5 Drawing Sheets

AUGMENTED REALITY POSITIONING AND TRACKING SYSTEM AND METHOD

CROSS-REFERENCE TO RELATED APPLICATIONS

This patent application claims the benefit of priority from U.S. Provisional Patent Application No. 62/592,368, filed on Nov. 29, 2017, which is incorporated by reference herein in its entirety.

FIELD

The present disclosure generally relates to augmented reality systems, devices and applications executing on devices, and more particularly to detecting the specific location, orientation, surface plane(s) and scale of a real-world object and the device capturing/viewing the object, and providing an augmented reality view of the object based therefrom.

SUMMARY

Augmented reality applications allow a user to view a presentation of the world augmented with or superimposed by computer-generated imagery. The imagery can be, for example, graphical or textual, static or dynamic, interactive, and/or some combination thereof. The presented world may be provided directly to the user, such that when the user is looking through a displayed interface, the augmented imagery is applied to or projected on the interface appearing as integrated with the physical world.

Augmented reality (AR) is now being implemented on mobile computing devices that include digital cameras or other image sensors. In such implementations, the view that is currently being captured by the camera can be displayed as a scene on a screen of the mobile device. The disclosed systems and methods provide a novel, efficient and accurate mechanism for launching an AR application that provides an AR view of a captured or currently being viewed image.

Conventional systems that perform image recognition analysis in order to determine the positioning of an applied AR layer or AR integration can be inefficient, inaccurate and tie-up a great deal of a device's processing resources (e.g., memory and processing power). The instant disclosure's AR positioning and tracking systems and methods provide a more efficient system that maximizes the device's computational resources in order to simply and accurately determine the viewed object's positioning and orientation respective to the viewing/capturing device thereby ensuring an efficiently and accurately rendered AR experience.

The disclosed systems and methods also provide improved mechanisms for accurately aligning the digital augmentation to a physical object regardless of the size, position, orientation or shape of the digital object (e.g., even if the object is large (e.g., a car or building) or difficult to recognize through conventional computer vision).

In accordance with one or more embodiments, the instant disclosure provides computerized methods for executing the AR positioning and tracking mechanisms disclosed herein, as well as a non-transitory computer-readable storage medium for carrying out the above mentioned technical steps of the AR framework. The non-transitory computer-readable storage medium has tangibly stored thereon, or tangibly encoded thereon, computer readable instructions that when executed by a device (e.g., messaging server, client device, and the like) cause at least one processor to perform a method for determining tracking and positioning of an AR system, as well as carrying out the AR on an image(s)/scene(s).

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
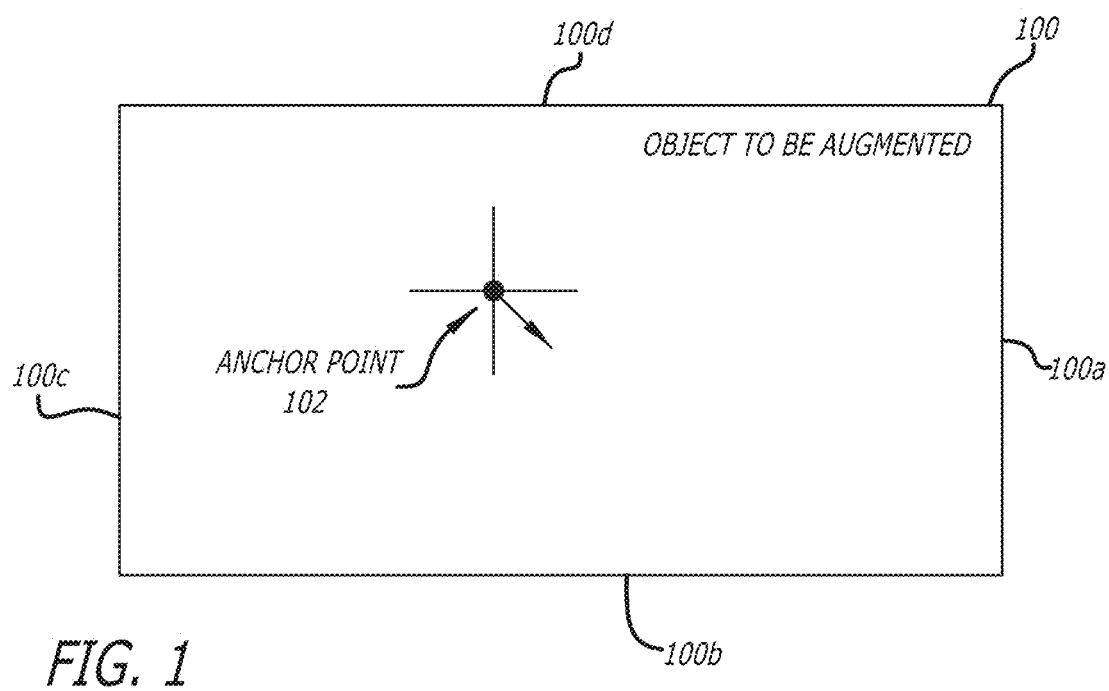
FIG. 1 depicts a schematic diagram illustrating an anchor point's association with an object to be augmented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

The principles described herein may be embodied in many different forms. The instant disclosure provides advanced systems and methods for determining the position and orientation of an object being viewed by a capturing device (e.g., a smartphone). Additionally, the rotation and movement of the device is tracked via the disclosed systems and methods discussed herein. Therefore, the implementation of the disclosed systems and methods provide a precise position of the real world object to be augmented, which is then used to properly provide accurate AR imagery overlaid thereon. In addition to the speed and efficiency in which the positioning, tracking and AR implementation is achieved through the disclosed systems and methods, the implementation of the disclosed mechanisms enables AR to be accurately rendered in scenarios where 3D image capture and recognition may be ineffective, such as when the portions of the viewed real-world object is obscured (e.g., either hidden behind other objects or covered in dirt, for example), as evidenced from the disclosure herein.

According to embodiments of the instant disclosure, a contact or proximity detectable marker is associated with a physical object with known dimensions. For example, the object can be a car, plane, building or an engine, or any other type of real-world object, and such objects have predetermined dimensions in a three-dimensional (3D) space with known X,Y,Z coordinates. The marker can be associated with the object by, for example, affixing the marker on the object, or installing the marker on or within the object. Such association (e.g., the affixing or installation) of the marker is made at a predetermined position that corresponds to an anchor point within 3D coordinate space occupied by the object. This anchor point therefore corresponds to the origin location from which all measurements or distances or positions are based for which to render augmentation. For example, the anchor point of an object has the 3D coordinates of 0,0,0.

A mechanism, such as a device outline or physical structure(s) facilitating accurate positioning of the device used to visualize the object to be augmented, is positioned or affixed or integral to the object to provide for a predetermined initial position and/or orientation of the device, so that when the device is placed at the anchor point in the proper initial position and/or orientation, the software operating on the device can use the anchor point and the device's initial proper position and/or orientation relative to the object to place augmented content in the proper placement overlying and/or surrounding the object without the device having to perform 3D object recognition of the object.

FIG. 1 illustrates an anchor point's association with an object to be augmented according to some embodiments of the present disclosure. As illustrated in FIG. 1, the object to be augmented 100 has associated therewith an anchor point 102. The anchor point 102 has coordinates set at 0,0,0; and can be located (or associated with) any position on the object. The object 100 in this example, has 4 defined edges: 100a-100d, and each edge has known dimensional values. The dimensional values are based upon their location to the anchor point (i.e., the direction and position of the edges relative to the anchor point's position on the object).

According to some embodiments, the anchor point 102 has associated therewith a near field communication (NFC) tag. For example, a NFC tag may be affixed to a location on the car (e.g., a specific location on the driver-side window, or on the license plate, and the like). The NFC tag, for example, can be an RFID tag. As discussed in more detail below, a user can scan the NFC tag with their mobile device, and such scanning provides 1) the type of object the NFC tag is associated with, and 2) the exact positioning of the car relative to the scanning device.

Figure 2:
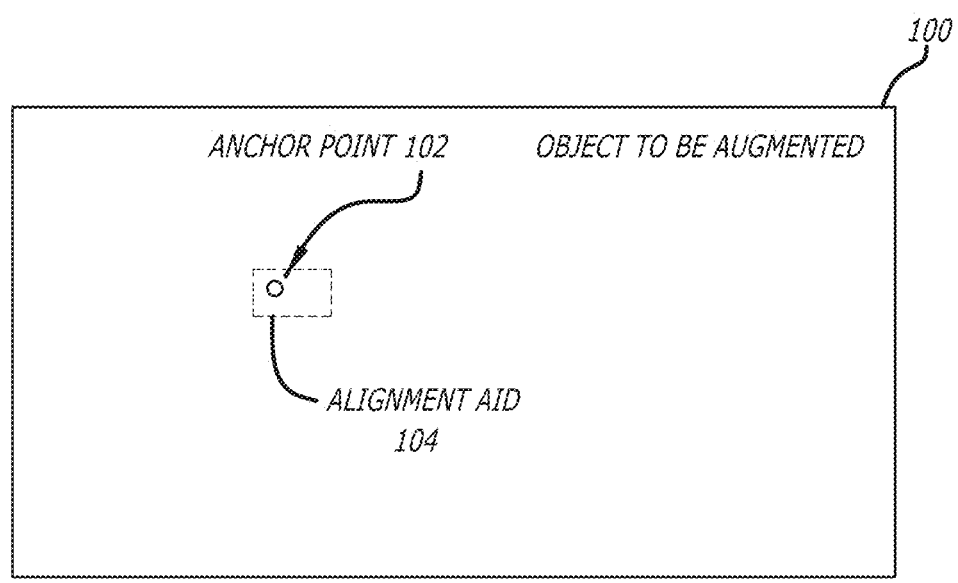
FIG. 2 depicts a schematic diagram illustrating an anchor point and an embodiment of an associated augmentation aid according to some embodiments of the present disclosure.

FIG. 2 depicts a schematic diagram illustrating an anchor point 102 and an embodiment of an associated augmentation aid 104 according to some embodiments of the present disclosure. In a similar manner discussed in relation to FIG. 1 above, the anchor point 102 is located in a predetermined position on the object 100. FIG. 2 depicts an embodiment of an augmentation aid 104 that is associated with the anchor point 102 on the object 100. The augmentation aid 104 provides guidance for the user when scanning the NFC tag by explicitly illustrating the exact position and orientation of the device the user is using to scan the NFC tag located at the anchor point 102. In the example, in FIG. 2, the augmentation aid 104 is a rectangle (or other shaped outline indicative of device placement) that encompasses anchor point 102, such that when the user places his/her device properly within the confines of the aid 104, the device's NFC sensor properly aligns with the NFC tag at the anchor point 102, which enables the NFC scanning to occur. As discussed above, this enables the device to determine the position of the object, and identify the specific type (e.g., identity) of the object.

Figure 3:
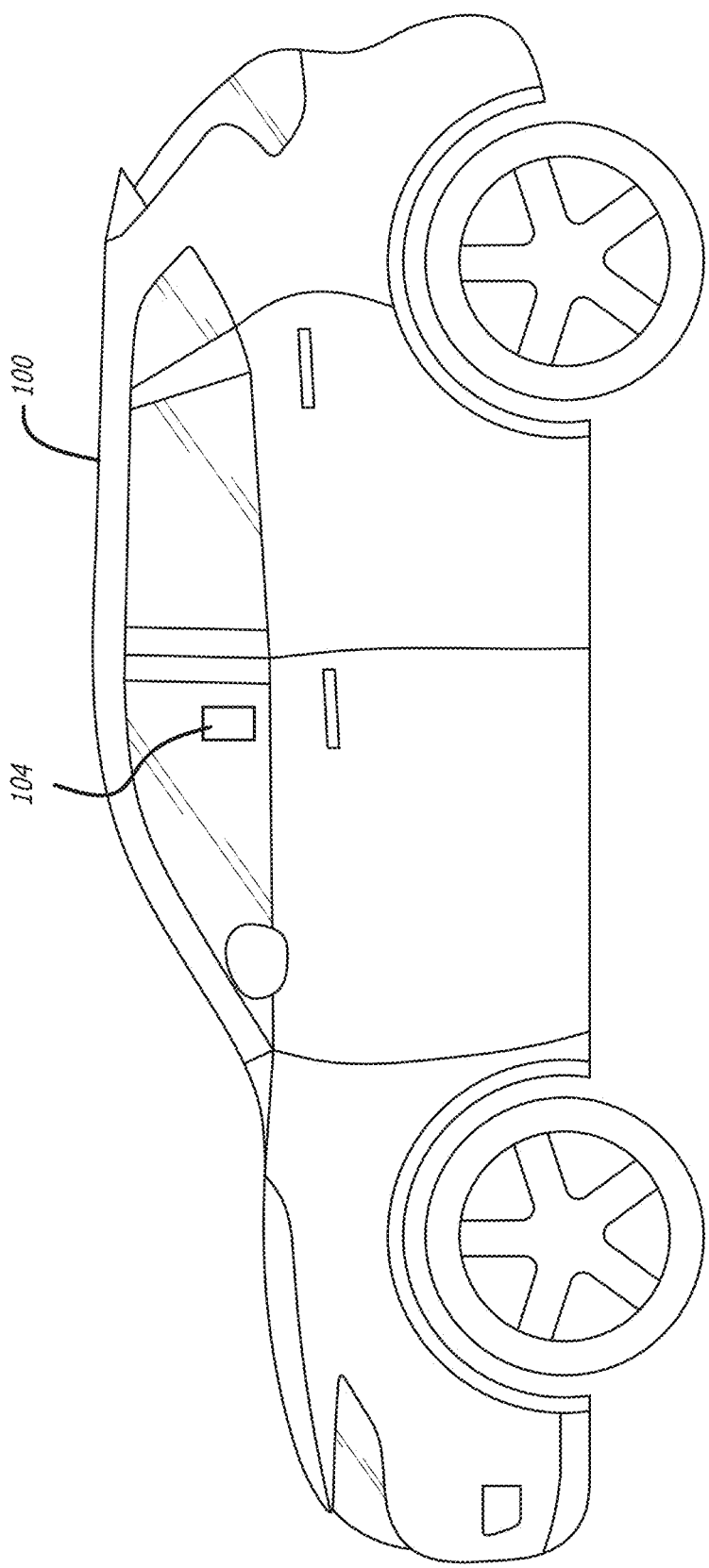
FIG. 3 depicts a non-limiting example of a real-world object having associated therewith an anchor point and augmentation aid according to some embodiments of the present disclosure.

FIG. 3 depicts a non-limiting example of a real-world object having associated therewith an anchor point and augmentation aid, according to the embodiments discussed above in relation to FIG. 2. The object 100 here is a car, specifically, a Nissan Rogue®, and the augmentation aid 104 is affixed to the driver-side window the car 100. As discussed above, the augmentation aid 104 encompasses the anchor point 102, so that in order for the user to scan the NFC tag associated with anchor point 102, the user must align his device in accordance with the augmentation aid 104.

Upon performing such alignment, the user's device will scan the NFC tag and receive a NFC signal that identifies that the car is a Nissan Rogue. The device has stored, or can obtain, dimensional information for the specific car identified by the tag (or the tag can just supply an anchor point and the user can manually select a car type from a list of cars supported by the application providing the augmentation). These dimensions can be respective to, and provide the shape and outlining portions of the car (e.g., the location, respective to the anchor point, of the front of the car, top of the car, windshield, wheels, bottom of car, and the trunk, for example). In some embodiments, the dimensions can be related to each and every feature (or a subset of features) of the car—such as, for example, the wheels, the rims of the wheels, spokes of the rims, the door handles, windows, gas tank, lights, windshield wipers, and the like. These dimensions relative to the anchor point, as discussed in more detail below, are utilized to apply the AR imagery to the car.

Figure 4:
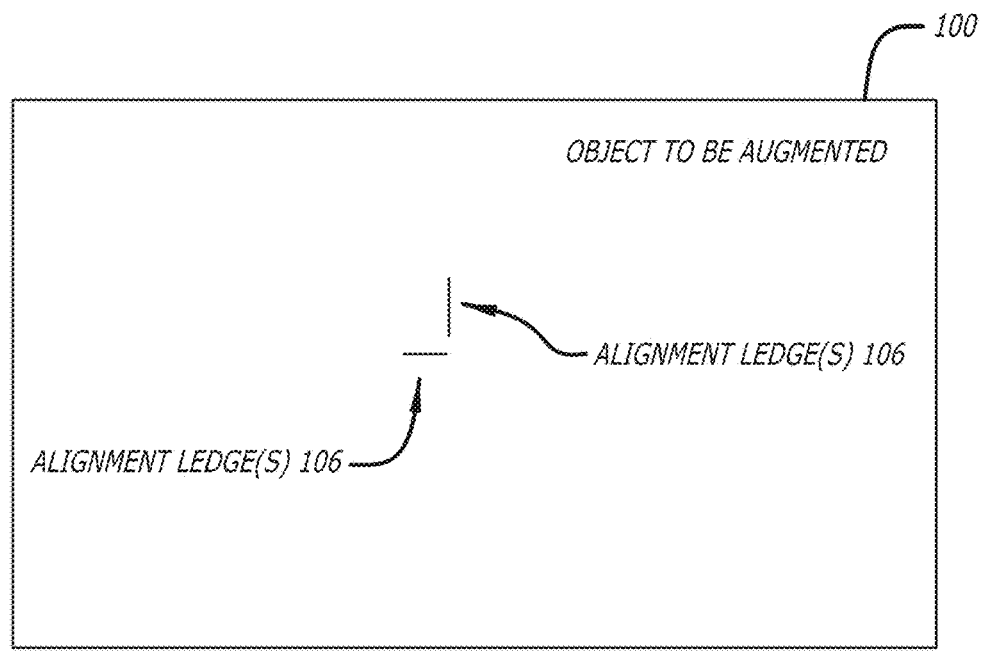
FIG. 4 depicts a schematic diagram illustrating an anchor point and an embodiment of an associated augmentation aid according to some embodiments of the present disclosure.

According to some embodiments, an augmentation aid can take any form. For example, as illustrated in FIG. 4, the augmentation aid is a ledge(s) 106. In some embodiments, the ledges can be on only one side of the anchor point 102, or surround each of the sides of the anchor point, or any combination thereof. For example, a ledge can be horizontally placed below and/or above the anchor point, and/or on the left and/or right side of the anchor point, and/or at any other angle surrounding the anchor point. These ledges are situated on the object at a positional distance relative to the anchor point 102 so that when the user aligns his/her device up with the ledge(s) 106, the device's NFC sensor aligns with NFC tag associated with the anchor point 102. A physical ledge or other physical alignment mechanism for physical registration with one or more edges or surfaces of a device can be very useful in environments where a printed or embossed augmentation aid might be obscured, such as, for example, in an application where AR is used to assist a mechanic in the field in repairing an engine of a piece of equipment that has been muddied, worn, or otherwise made indistinguishable, thus frustrating proper device alignment with a printed augmentation aid or the use of common 3D object detection techniques.

Figure 5:
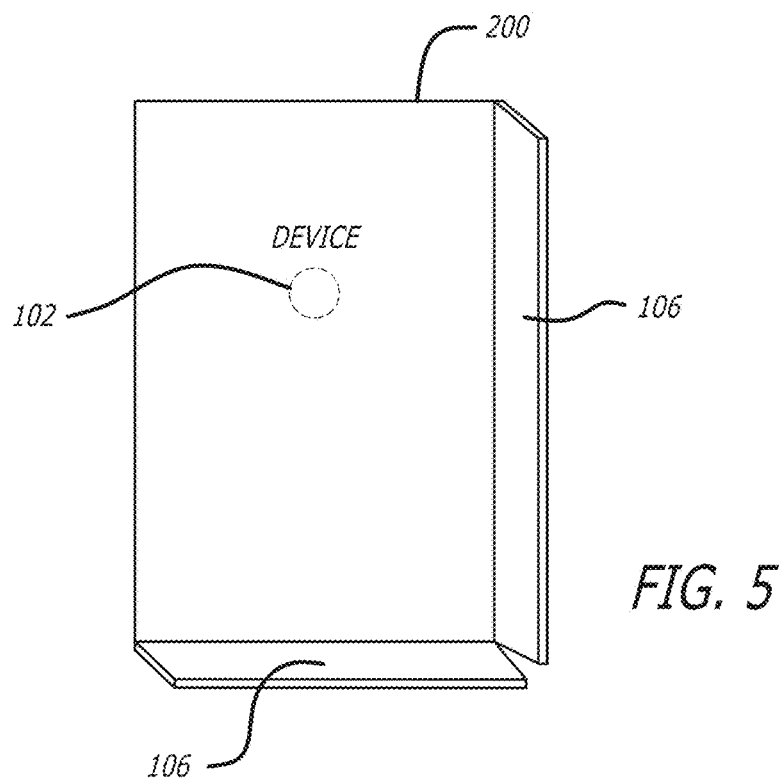
FIG. 5 depicts a schematic diagram of a non-limiting example of a device interacting with a NFC anchor point according to an augmentation aid in accordance with some embodiments of the present disclosure.

FIG. 5 depicts a non-limiting example of a device interacting with a NFC anchor point as guided by an example augmentation aid 106, as discussed above in relation to FIG. 4. The device 200 can be any type of device that has camera functionality and NFC capability for scanning a NFC tag (or RFID tag, for example). For example, the device can be a smart phone, tablet, wearable computer or other device equipped with sensors and capable of running augmented reality software. The edges of the device 200 are aligned with each of the 2 ledges 106, which causes the NFC sensor of the device 200 to accurately align with the NFC tag situated on the object 100 at the anchor point 102. As discussed above, and in more detail below, this enables the device to scan the NFC tag, and identify the type of object and the object's exact positioning relative to the device and anchor point. This then enables the device to identify a specific form of AR imagery that is accurately overlaid on the object 100 based on the positioning and known dimensions of the object, as discussed in more detail below.

Figure 6:
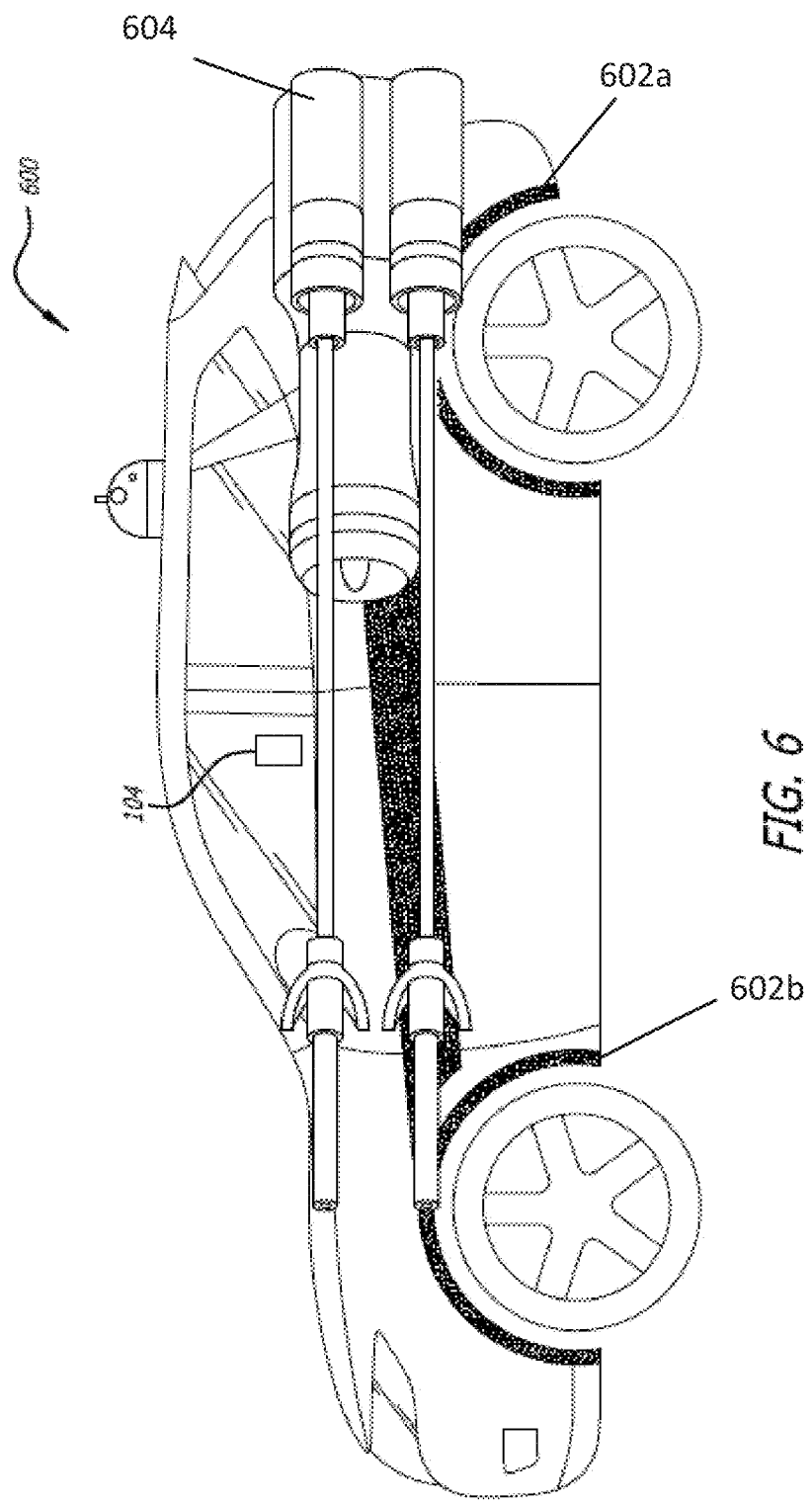
FIG. 6 depicts a non-limiting example of an augmented reality view of the object depicted in FIG. 3 in accordance with some embodiments of the present disclosure.

FIG. 6 depicts a non-limiting example of an augmented reality view of the object depicted in FIG. 3 in accordance with some embodiments of the present disclosure. The object 100 in FIG. 3 was a car (a Nissan Rogue®). The car 600 depicted in FIG. 6 is the same car but with AR imagery overlay applied. As discussed in more detail below, this overlay is applied based on the anchor point's coordinates and the positioning of the car relative to the device, and is maintained as the user moves around the car. In the example depicted in FIG. 6, the car 600 has added AR imagery of wings 604, which are depicted on both sides of the car 600, and shading over the wheel-wells: items 602a and 602b. Therefore, the wings 604 and shadings 602a-602b added to the car are accurately depicted from any of the angles or positions the user is viewing the car, as the device's location is tracked relative to the exact positioning of the car obtained during scanning of the NFC tag (via anchor point detection). This accurate depiction is maintained by, for example, depth sensors associated with device, or any type of known or to be know technique for applying AR imagery to a viewed image (e.g., using data obtained by the device's one or more accelerometers, gyroscopes, camera, or calculated by the device performing simultaneous localization and mapping (SLAM) computations based therefrom).

Figure 7:
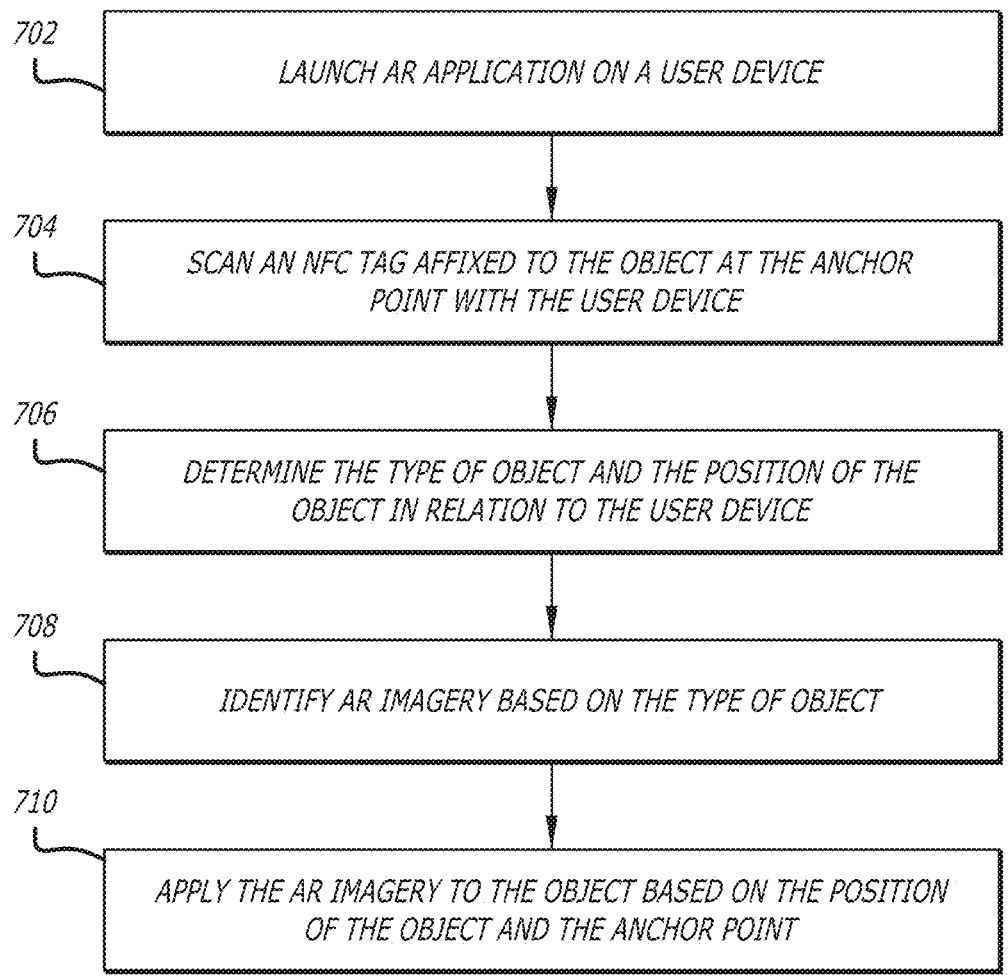
FIG. 7 is a flowchart detailing a process performed according to some embodiments of the instant disclosure.

FIG. 7 is a flowchart detailing a process performed according to some embodiments of the instant disclosure. The process begins with Step 702 where an AR application is launched by a user's device. The AR application, which can be a stand-alone application locally installed on the user's device or a web-based application, includes functionality for activating the sensors on the device and for applying the AR imagery to the viewed/captured object. For example, the AR application controls the NFC sensor of the device, such that as in Step 704, when the device is properly situated over the NFC tag at the anchor point (as discussed above), the NFC sensor of the device automatically detects and reads the NFC tag's data.

In Step 706, based on the received data obtained from scanning the NFC tag on the object (in Step 704), the AR application is able to determine the type of the object (e.g., the identity of the object) and the real-world position of the object relative to the device. For example, the NFC data can provide the identity of the object and the positioning information, as discussed above. In another example, the NFC data can provide an identifier that the AR application can use to search for and identify the type of object. For example, the AR application can search a database or look-up table (which can be locally stored or remotely located) based on information from the NFC signal, and identify the type information.

In Step 708, the AR application identifies the AR imagery that corresponds to the type of object. Such imagery can be a still image, or can be an interactive scene(s) that involves interactive AR images, as one of skill in the art would understand. For example, the object (from Step 706) is determined to be a Nissan Rogue; therefore, the AR application identifies the AR imagery that directly corresponds to that specific car. The identified (or selected) AR imagery has dimensional coordinates that directly match and fit the dimensions of the Nissan Rogue. For example, the imagery 600 (from FIG. 6) that overlaid the car 100 (from FIG. 3) is specific imagery that corresponds to that type (and model) car.

In Step 710, the AR application then applies the identified AR imagery based on the coordinates of the anchor point and position of the object relative to the device. This application of the AR imagery is performed based, at least in part, on the coordinates of the anchor point of the object. The AR imagery's dimensions and coordinates match that of the object's dimensions and coordinates; therefore, the anchor point's coordinates are accounted for when aligning the AR imagery over the object's depiction (i.e., the AR imagery is aligned to the anchor point). This, therefore, causes the AR experience that is viewable within the AR application's viewing interface on the device—an example of which is depiction of object/car 100 in FIG. 6.

Thus, as a result of the process of FIG. 7 detailed above, the exact location of the object relative to the device is determined. This enables the device, via the AR application executing therein, to produce the AR viewing experience where an augmented view of the object is provided from any vantage point the device is viewing the object from. As discussed above, after the positioning and AR imagery is applied to the object, the AR application implements the depth, gyroscope, accelerometer and camera sensors (or other sensors that can be used to sense the devices portion, orientation and or movement through a physical space) in order to effectuate an interactive AR experience.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    scanning, via a device, an object tag associated with an object via a near field communication (NFC) signal, said scanning performed according to an augmentation aid associated with said object, said augmentation aid comprising a physical alignment mechanism of at least two ledges for physically aligning the device relative to the object tag;
    determining, via the device, object information based on said scanning, said object information comprising a type of the object, an anchor point for the object, and a position of the object respective to the device;
    identifying, via the device, an augmented reality (AR) display associated with said object based on the type; and
    displaying, via the device, a visual display of the object with said AR overlaid relative to said detected anchor point and device position.

2. The method of claim 1, further comprising:
    retrieving, from storage, dimensional information for said object based on said determined object information, said AR overlay is further based on said dimensional information.

3. The method of claim 2, wherein said dimensional information comprises information indicating coordinates indicating a shape and outlining portions of the object respective to the anchor point.

4. The method of claim 2, wherein said dimensional information comprises information indicating coordinates of each external feature of the object respective to said anchor point.

5. The method of claim 1, wherein said visually displayed AR is maintained by said device as the device moves changes position around the object.

6. The method of claim 1, wherein said anchor point is within a three-dimensional (3D) coordinate space occupied by the object.

7. The method of claim 1, wherein said anchor point corresponds to an original location associated with the object from which all measurements and distances are based for rendering said AR.

8. The method of claim 1, wherein said object tag is affixed to said object.

9. The method of claim 1, wherein said object tag is an RFID tag.

10. The method of claim 1, said augmentation aid comprising information providing guidance for performing said scanning, said guidance enabling a sensor of the device to align with the anchor point of the object.

11. The method of claim 1, wherein said device comprises NFC capability and a camera.

12. An apparatus for augmented reality (AR) positioning and tracking, comprising:
an object affixed to a real-world object, said object comprising an augmentation aid that is associated with an anchor point of the real-world object, said augmentation aid comprising a physical alignment mechanism of at least two ledges for physically aligning a scanning device relative to the object; and
a near field communication (NFC) element situated within confines of said augmentation aid and associated with said anchor point, said NFC element enabling identification of a type of the real-world object and an exact positioning of the real-world object relative to the scanning device.

13. The apparatus of claim 12, wherein said ledges comprise at least one ledge above or below the anchor point and at least one ledge to the left or right of the anchor point.

14. The apparatus of claim 12, wherein said physical alignment mechanism comprises an outlined shape surrounding the anchor point.

15. The apparatus of claim 12, wherein said physical alignment mechanism is shaped and sized for mating engagement and proper alignment of the device with said NFC element.

16. The apparatus of claim 12, wherein said anchor point is within a three-dimensional (3D) coordinate space occupied by the real-world object, said anchor point being at an original location associated with the real-world object from which all measurements and distances are based for rendering AR in association with said real-world object.

17. The apparatus of claim 12, wherein said NFC element is an RFID tag.

* * * * *